US 10,830,181 B2

(12) United States Patent
Interiano

(10) Patent No.: US 10,830,181 B2
(45) Date of Patent: Nov. 10, 2020

(54) THERMALLY INITIATED VARIABLE VENTING SYSTEM FOR ROCKET MOTOR

(71) Applicant: GOODRICH CORPORATION, Charlotte, NC (US)

(72) Inventor: Luis G. Interiano, Galt, CA (US)

(73) Assignee: Goodrich Corporation, Charlotte, NC (US)

( * ) Notice: Subject to any disclaimer, the term of this patent is extended or adjusted under 35 U.S.C. 154(b) by 281 days.

(21) Appl. No.: 16/136,125

(22) Filed: Sep. 19, 2018

(65) Prior Publication Data
US 2020/0088137 A1  Mar. 19, 2020

(51) Int. Cl.
| F02K 9/38 | (2006.01) |
| B64G 1/40 | (2006.01) |
| F42B 39/20 | (2006.01) |
| F02K 9/92 | (2006.01) |
| F02K 9/26 | (2006.01) |
| F42B 39/14 | (2006.01) |
| F02K 9/08 | (2006.01) |
| F02K 9/95 | (2006.01) |

(52) U.S. Cl.
CPC ................ *F02K 9/38* (2013.01); *B64G 1/403* (2013.01); *F02K 9/08* (2013.01); *F02K 9/26* (2013.01); *F02K 9/92* (2013.01); *F02K 9/95* (2013.01); *F42B 39/14* (2013.01); *F42B 39/20* (2013.01)

(58) Field of Classification Search
CPC ... B64G 1/403; F02K 9/08; F02K 9/26; F02K 9/38; F02K 9/92; F02K 9/95; F42B 39/14; F42B 39/20
USPC .................................................. 220/89.1–89.4
See application file for complete search history.

(56) References Cited

U.S. PATENT DOCUMENTS

| 3,486,410 A * | 12/1969 | Lake ...................... F42B 15/38 89/1.14 |
| 4,597,261 A * | 7/1986 | Dolan ..................... F42B 39/20 60/223 |
| 5,466,537 A | 11/1995 | Diede et al. |
| 7,086,629 B2 * | 8/2006 | Hilden ...................... B26F 3/04 244/122 AF |
| 8,082,846 B2 | 12/2011 | Cook et al. |
| 9,625,240 B2 | 4/2017 | McDonald et al. |
| 2017/0350681 A1 | 12/2017 | Campbell et al. |

* cited by examiner

*Primary Examiner* — William H Rodriguez
*Assistant Examiner* — Kyle Robert Thomas
(74) *Attorney, Agent, or Firm* — Snell & Wilmer L.L.P.

(57) ABSTRACT

A thermally initiated variable venting system may comprise a first linear shape charge (LSC) coupled to a first sensor and a second LSC coupled to a second sensor. An upper apex of the second LSC may be disposed within a lower apex of the first LSC. The output of the system may vary depending on whether the event is fast cook-off (FCO) or slow cook-off (SCO).

20 Claims, 5 Drawing Sheets

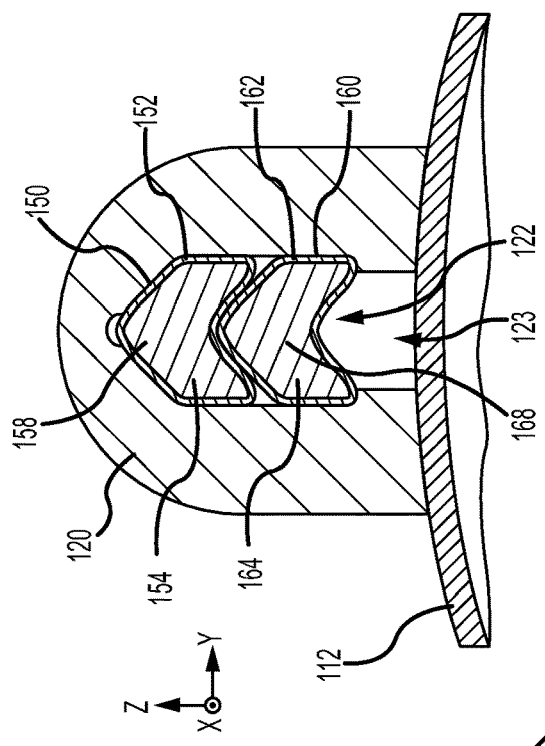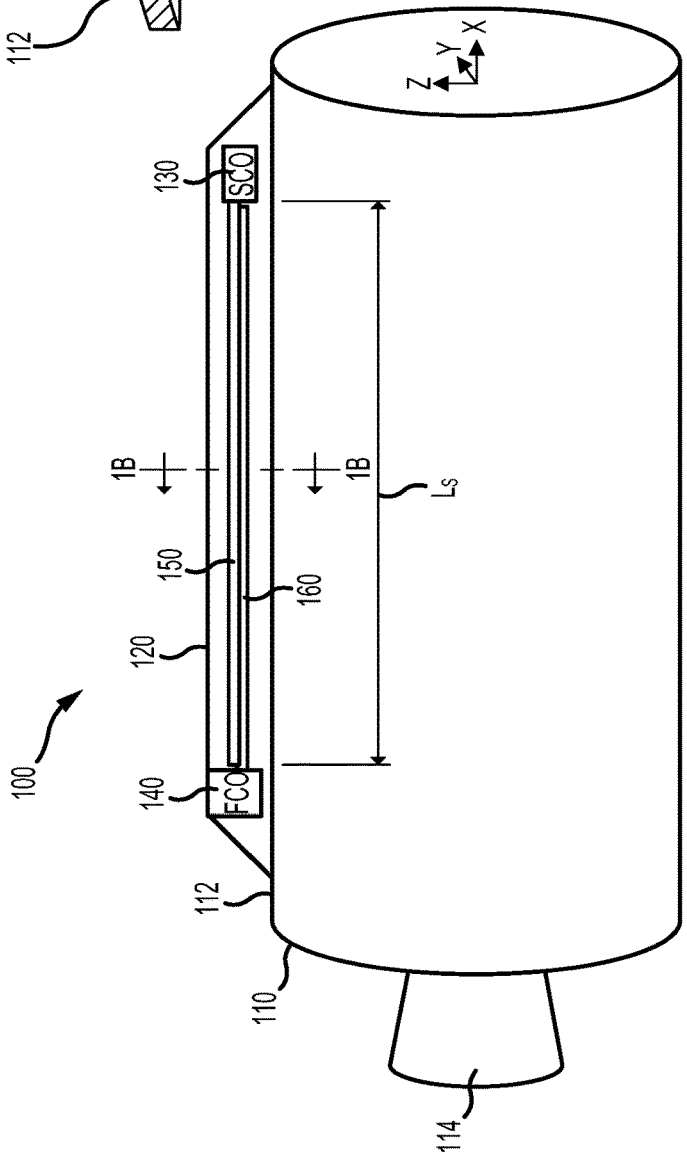

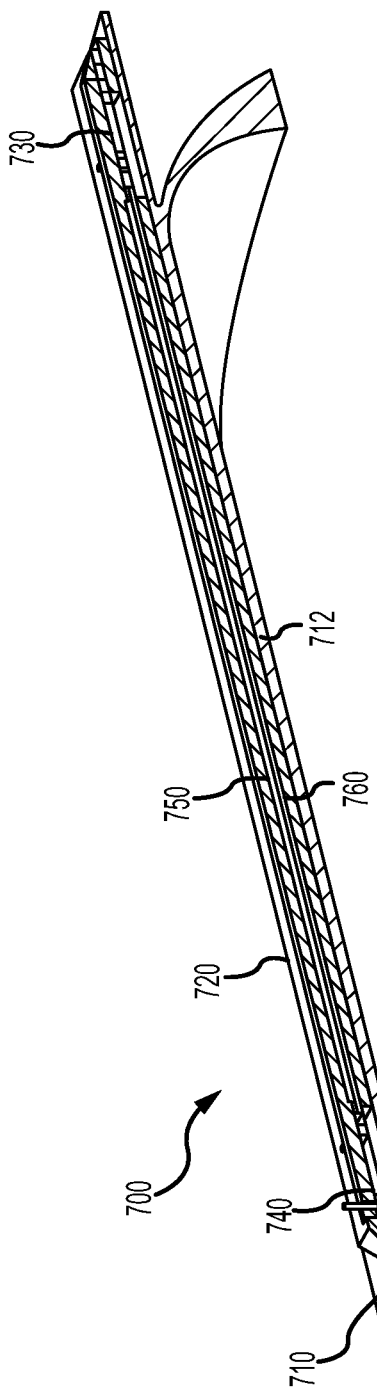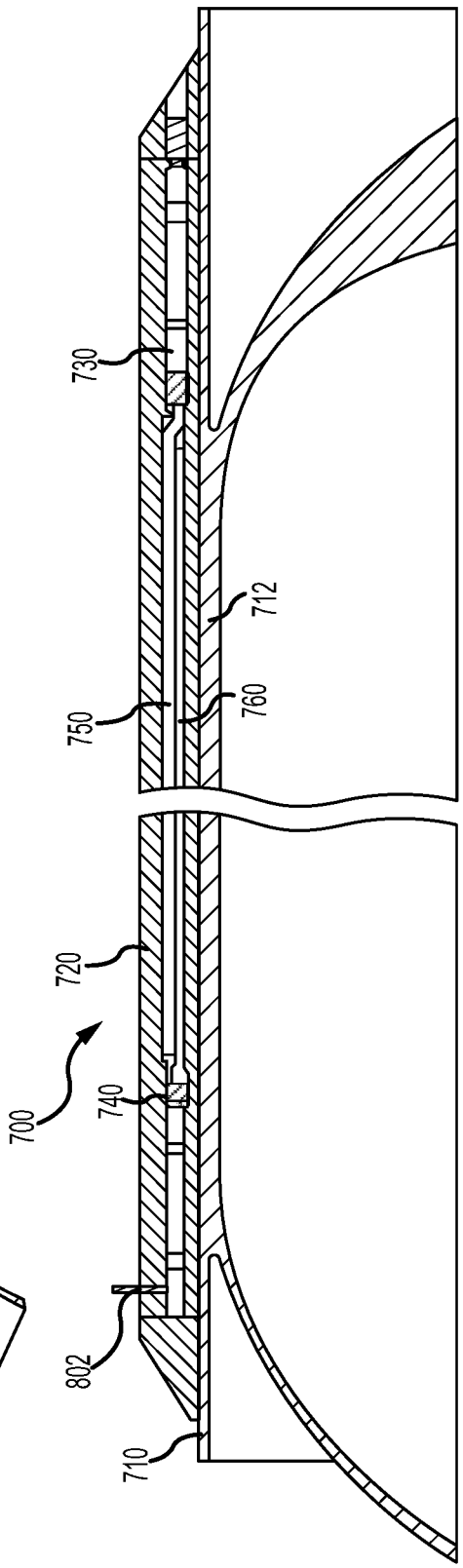

THERMALLY INITIATED VARIABLE VENTING SYSTEM FOR ROCKET MOTOR

FIELD

The present disclosure relates generally to rocket motors, and more particularly, to a system which is active before the firing of a rocket motor and which senses heat around the rocket motor which might ignite the rocket motor or cause it to explode.

BACKGROUND

When a rocket motor is subjected to temperatures which would be reached in a fortuitous fuel fire, the solid fuel of the rocket motor may ignite or explode. Unless steps are taken, ignition will cause thrust and the rocket motor will be propelled. Should this occur in an enclosed space such as a hangar or on an airport or a flight deck, the resultant rocket motor flight is quite dangerous and destructive. Likewise, an explosion due to rocket motor heating may lead to significant destruction and hazards surrounding the device.

SUMMARY

A thermally initiated variable venting system is disclosed, comprising a first linear shape charge (LSC) coupled to a first sensor, and a second LSC coupled to a second sensor, wherein the first LSC overlaps the second LSC, the first sensor is configured to activate to ignite the first LSC in response to at least a portion of the first sensor reaching a first temperature, the second sensor is configured to activate to ignite the second LSC in response to at least a portion of the second sensor reaching a second temperature, the thermally initiated variable venting system configured to project a molten jet in response to at least one of the first LSC being ignited by the first sensor and the second LSC being ignited by the second sensor.

In various embodiments, the molten jet is greater in response to the first LSC being ignited by the first sensor.

In various embodiments, the molten jet is configured to cut a slot through a motor case in response to the first LSC being ignited by the first sensor.

In various embodiments, the molten jet is configured to cut a trench into a motor case in response to the second LSC being ignited by the second sensor.

In various embodiments, at least one of a velocity, a pressure, and a temperature of the molten jet is greater in response to the first LSC being ignited by the first sensor than in response to the second LSC being ignited by the second sensor.

In various embodiments, the molten jet is generated by a detonation wave that travels in a direction perpendicular to the molten jet.

In various embodiments, the first temperature is less than the second temperature.

In various embodiments, the first sensor comprises a slow cook off (SCO) sensor and the second sensor comprises a fast cook off (FCO) sensor.

In various embodiments, the first LSC comprises a sheath defining a main charge cavity and an explosive charge material contained in the main charge cavity.

In various embodiments, the sheath comprises a hollowed chevron-shaped cross-section that defines the main charge cavity, the chevron-shaped cross-section defining an upper apex and a lower apex, and an upper apex of the second LSC is disposed in the lower apex of the first LSC.

A rocket motor is disclosed, comprising a rocket motor case, a cover coupled to the rocket motor case and extending longitudinally along an outer surface of the rocket motor case, a channel disposed in the cover, an opening of the channel facing the rocket motor case, a first linear shape charge (LSC) coupled to a first sensor, at least a portion of the first LSC disposed in the channel, and a second LSC coupled to a second sensor, at least a portion of the second LSC disposed in the channel, wherein the second LSC is disposed between the first LSC and the rocket motor case, the first sensor is configured to activate to ignite the first LSC in response to at least a portion of the first sensor reaching a first temperature, the second sensor is configured to activate to ignite the second LSC in response to at least a portion of the second sensor reaching a second temperature, wherein a molten jet is projected from the opening in the channel in response to at least one of the first LSC being ignited by the first sensor and the second LSC being ignited by the second sensor.

In various embodiments, the molten jet is configured to cut a slot through a motor case in response to the first LSC being ignited by the first sensor.

In various embodiments, the molten jet is configured to cut a trench into a motor case in response to the second LSC being ignited by the second sensor.

In various embodiments, at least one of a velocity, a pressure, and a temperature of the molten jet is greater in response to the first LSC being ignited by the first sensor than in response to the second LSC being ignited by the second sensor.

In various embodiments, the first temperature is less than the second temperature.

In various embodiments, the first sensor comprises a slow cook off (SCO) sensor and the second sensor comprises a fast cook off (FCO) sensor.

In various embodiments, the first LSC comprises a sheath defining a main charge cavity and an explosive charge material contained in the main charge cavity.

In various embodiments, the sheath comprises a hollowed chevron-shaped cross-section that defines the main charge cavity, the chevron-shaped cross-section defining an upper apex and a lower apex, and an upper apex of the second LSC is disposed in the lower apex of the first LSC.

A method for manufacturing a thermally initiated variable venting system is disclosed, comprising disposing a first linear shape charge (LSC) into a channel of a cover, disposing a second LSC into the channel, and coupling the cover to a rocket motor case, wherein an opening in the channel faces the rocket motor case, the second LSC disposed between the first LSC and the rocket motor case.

In various embodiments, the method further comprises disposing an upper apex of the second LSC within a lower apex of the first LSC.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 1A illustrates a schematic view of a solid rocket motor comprising a thermally initiated variable venting system, in accordance with various embodiments;

FIG. 1B illustrates a cross section view of the thermally initiated variable venting system of FIG. 1A, in accordance with various embodiments;

FIG. 2 illustrates a cross section view of a linear shaped charge, in accordance with various embodiments;

FIG. 7 and FIG. 8 illustrate a section view of a solid rocket motor comprising a thermally initiated variable venting system, in accordance with various embodiments.

DETAILED DESCRIPTION

Figure 3:
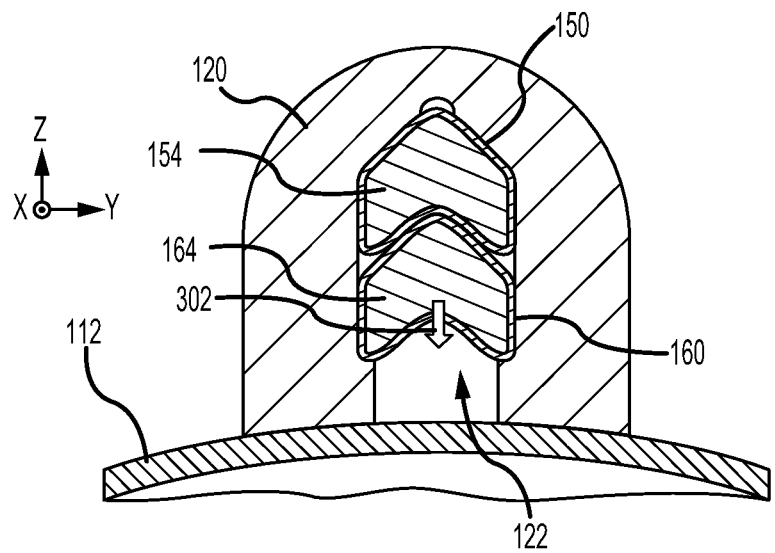
FIG. 3 illustrates a cross section view of the thermally initiated variable venting system of FIG. 1A, schematically illustrating a molten jet projected from a bottom linear shaped charge in response to the bottom linear shaped charge being ignited before a top linear shaped charge, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

With reference to FIG. 1A, a thermally initiated variable venting system (system) 100 is schematically illustrated, in accordance with various embodiments. System 100 may include a rocket motor 110. Rocket motor 110 may comprise a rocket motor case 112. Rocket motor case 112 may be in the form of a cylindrical tube throughout most of its length. In various embodiments, rocket motor case 112 may be the outer wall of the aft part of an airframe or may be a "slip-in" motor case housed within the airframe. Furthermore, the concepts of the present disclosure may be useful for any system which utilizes a rocket motor. Rocket motor case 112 may be normally closed, except for a nozzle 114 at its rear end. Rocket motor case 112 may carry a grain of solid rocket fuel therein. Upon combustion, this grain produces hot gas which raises the pressure within the rocket motor case. The hot gas is expelled from the nozzle 114, producing thrust. Rocket motor case 112 is sufficiently strong to withstand the pressure of hot gas generation therein. The safety system of the present disclosure is directed to opening the side of the rocket motor case 112 or weakening it sufficiently so that internal hot gas pressure causes opening of the side as the pressure rises.

In various embodiments, a cover 120 may be coupled to rocket motor case 112. Cover 120 may extend longitudinally along an outer surface of the rocket motor case 112. In various embodiments, cover 120 may be hermetically sealed to rocket motor case 112. A slow cook off (SCO) sensor 130 may be disposed in cover 120. A first linear shaped charge (LSC) 150 may extend from SCO sensor 130. Furthermore, a fast cook off (FCO) sensor 140 may be disposed in cover 120. A second LSC 160 may extend from FCO sensor 140. The first LSC 150 may be disposed radially outward from the second LSC 160. The first LSC 150 may overlap the second LSC 160. Stated differently, the first LSC 150 may be disposed over the second LSC 160. Stated yet differently, the second LSC 160 may be disposed between the first LSC 150 and the rocket motor case 112.

In various embodiments, the SCO sensor 130 may be disposed opposite first LSC 150 from the FCO sensor 140. Similarly, the FCO sensor 140 may be disposed opposite second LSC 160 from the SCO sensor 130. First LSC 150 may be ignited by SCO sensor 130 at the end of first LSC 150 which is coupled to SCO sensor 130. Second LSC 160 may be ignited by FCO sensor 140 at the end of second LSC 160 which is coupled to FCO sensor 140. In this regard, first LSC 150 and second LSC 160 are ignited from opposite ends. Furthermore, SCO sensor 130 and FCO sensor 140 may operate independently from each other.

In various embodiments, SCO sensor 130 may be configured to activate to ignite first LSC 150 in response to at least a portion of SCO sensor 130 reaching a first temperature (also referred to herein as an SCO temperature) at which the propellant grain inside of the rocket motor case 112 may be susceptible to being undesirably ignited. In various embodiments, FCO sensor 140 may be configured to activate to ignite second LSC 160 in response to at least a portion of FCO sensor 140 reaching a second temperature (also referred to herein as an FCO temperature) at which the propellant grain inside of the rocket motor case 112 may be susceptible to being undesirably ignited. Both SCO sensor 130 and FCO sensor 140 may respond to elevated environmental temperatures. Due to the difference in the manner in which the sensors (i.e., SCO sensor 130 and FCO sensor 140) detect temperature changes and/or rates of temperate change, the sensors may react in response to different types of stimuli.

In various embodiments, the SCO temperature is less than the FCO temperature. In various embodiments, the FCO temperature is an external temperature (i.e., a temperature of the surrounding atmosphere) such as ambient temperature. In various embodiments, the SCO temperature is an internal temperature (i.e., a temperature of at least a portion of SCO sensor 130. In this manner, it is possible for either SCO sensor 130 or FCO sensor 140 to be activated before the other, even though the SCO temperature may be less than the FCO temperature. For example, the FCO sensor 140 may detect an ambient temperature which is equal to or greater than the FCO temperature before an internal temperature of the SCO sensor 130 reaches the SCO temperature, and vice versa.

With reference to FIG. 1B, cover 120 may comprise a trench or channel 122 having an opening that faces rocket motor case 112. First LSC 150 and second LSC 160 may be disposed in channel 122. First LSC 150 may include a sheath 152 defining a main charge cavity 158. The sheath 152 extends along a longitudinal axis (e.g., an X-axis) between a first end and a second end to define a sheath length ($L_S$) of the sheath 152. The sheath 152 may have a first hollowed chevron-shaped cross-section that defines the main charge cavity 158. Second LSC 160 may similarly include a sheath 162 defining a main charge cavity 168. With additional reference to FIG. 2, which illustrates an isolated section view of first LSC 150, the chevron-shaped cross-section may define an upper apex 181, and a lower apex 182. The upper apex of second LSC 160 may be located in the lower apex of first LSC 150. The sheath 152 may be formed from various materials including, but not limited to, aluminum, copper, tungsten, tantalum, lead, tin, cadmium, cobalt, magnesium, titanium, zinc, zirconium, molybdenum, beryllium, nickel, silver, gold, and platinum. In various embodiments, second LSC 160 is similar to first LSC 150.

With reference to FIG. 1B, first LSC 150 may further include an explosive charge material (also referred to herein as a first explosive charge material) 154 contained in the main charge cavity 158. Second LSC 160 may further include an explosive charge material (also referred to herein as a second explosive charge material) 164 contained in the main charge cavity 168. With main charge cavity 158 and main charge cavity 168 filled with a respective explosive charge material 154, 164, first LSC 150 and/or second LSC 160 are configured to generate a detonation wave which travels along the length (e.g., the X-direction) of first LSC 150 and second LSC 160 which in turn projects a molten jet that travels in a direction perpendicular to the detonation wave (e.g., the negative Z-direction). The molten jet may be projected from the lower apex of the LSC.

Figure 4:
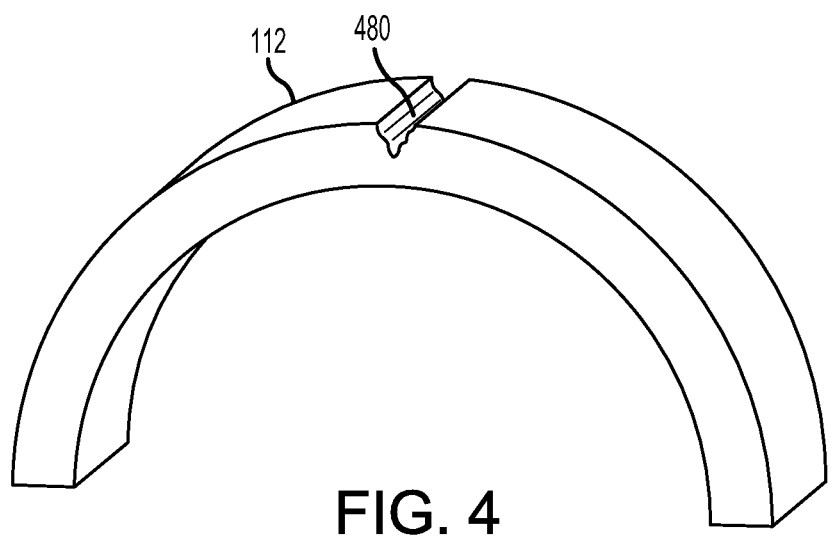
FIG. 4 illustrates a trench formed into a rocket motor case in response to the molten jet of FIG. 3, in accordance with various embodiments.

With reference to FIG. 1A through FIG. 4, and with particular focus on FIG. 3 and FIG. 4, in response to second LSC 160 being ignited, the second LSC 160 may generate a detonation wave, which in turn projects a molten jet 302 that travels in a direction perpendicular to the detonation wave (i.e., the negative Z-direction) and toward rocket motor case 112. In this scenario, where the second LSC 160 is ignited first, the first LSC 150 may have minimal impact on the molten jet 302 and the molten jet 302 may merely score the rocket motor case 112. Stated differently, the molten jet 302 may partially cut through the wall-thickness of rocket motor case 112, creating a trench 480 (see FIG. 4) therein.

Figure 5:
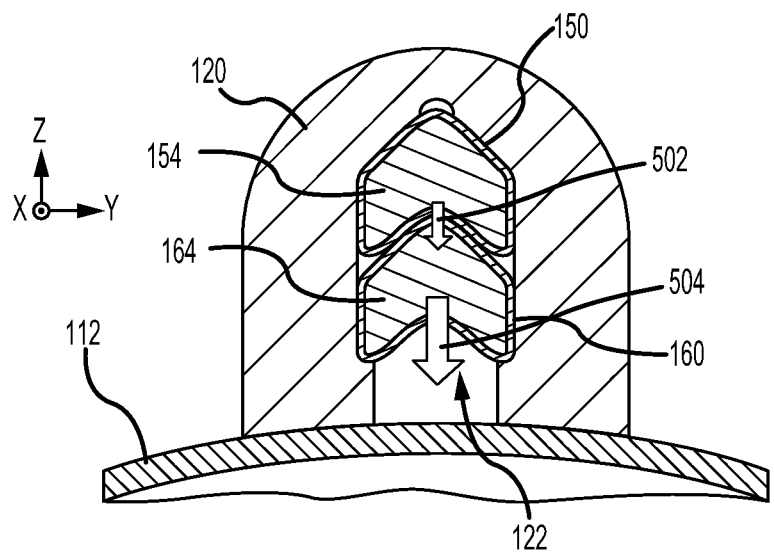
FIG. 5 illustrates a cross section view of the thermally initiated variable venting system of FIG. 1A, schematically illustrating a molten jet projected from a top linear shaped charge and a bottom linear shaped charge in response to the top linear shaped charge being ignited before the bottom linear shaped charge, in accordance with various embodiments.
Figure 6:
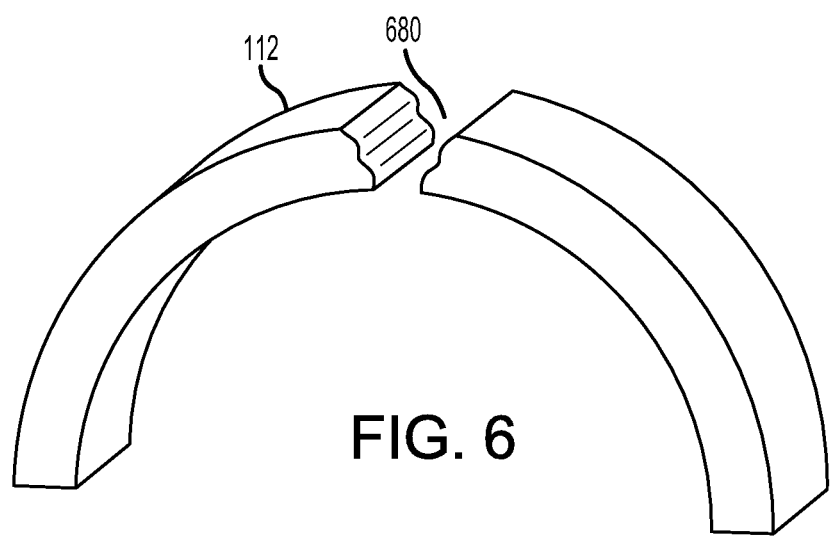
FIG. 6 illustrates a slot formed into a rocket motor case in response to the molten jet of FIG. 5, in accordance with various embodiments.

With reference to FIG. 1A through FIG. 6, and with particular focus on FIG. 5 and FIG. 6, in response to first LSC 150 being ignited, the first LSC 150 may generate a detonation wave, which in turn projects a molten jet 502 that travels in a direction perpendicular to the detonation wave (i.e., the negative Z-direction) and towards second LSC 160, which in turn ignites second LSC 160 and generates an even greater molten jet 504, which in turn is directed towards rocket motor case 112. Stated differently, the velocity, the pressure, and/or the temperature of molten jet 504 may be greater than that of molten jet 302 (see FIG. 3). In this scenario, where the first LSC 150 is ignited first, the effect of the first LSC 150 and the second LSC 160 are additively combined to generate the greater (i.e., having a greater velocity, pressure, and/or temperature than that of molten jet 302 of FIG. 3) molten jet 504 than if the second LSC 160 had been ignited first. In this manner, molten jet 504 may open the rocket motor case 112. Stated differently, the molten jet 504 may cut completely through the wall-thickness of rocket motor case 112, creating a slot 680 (see FIG. 6) therein. In this manner, the cutting performance of system 100 may vary depending on which LSC (i.e., first LSC 150 and second LSC 160) is ignited first.

Referring to FIG. 1A through FIG. 1B, the main charge cavity 158 may be filled with a first type of explosive charge material 154 and the main charge cavity 168 may be filled with a second type of explosive charge material 164. In various embodiments, explosive charge material 154 and explosive charge material 164 may be the same type of explosive charge material, such as a Hexanitrostilbene (HNS) or a plastic-bonded explosive (PBX), for example. In various embodiments, explosive charge material 154 may be different from explosive charge material 164. In various embodiments, explosive charge material 154 may be a plastic-bonded explosive (PBX) and explosive charge material 164 may be a Hexanitrostilbene (HNS). Upon detonation, the first explosive charge material and/or the second explosive charge material may produce a detonation wave having a detonation velocity. The detonation velocity of the explosive charge material dictates the rate at which the respective detonation wave propagates (i.e., the propagation rate).

In various embodiments, explosive charge material 154 may be packed at a different density than explosive charge material 164. In various embodiments, the propagation rate of explosive charge material 154 and/or explosive charge material 164 may be varied in response to the density thereof. In this regard, explosive charge material 154 may be packed at a greater density than explosive charge material 164 to increase the propagation rate of explosive charge material 154 relative to explosive charge material 164. In at least one embodiment, the packing density of the explosive charge material 154 may be greater than the packing density of the explosive charge material 164 by a ratio ranging from approximately 1.1:1.0 to approximately 2.0:1.0. It is appreciated, however, that the packing density ratio is not limited thereto. Furthermore, the propagation rate of explosive charge material 154 and/or explosive charge material 164 may be varied by using different explosive charge materials having inherently different propagation rates.

In various embodiments, the performance of system 100 may be varied by increasing and/or decreasing a cross-section area of main charge cavity 158 and/or a cross-section area of main charge cavity 168. For example, the cross-section area of main charge cavity 158 and/or main charge cavity 168 may be varied to increase and/or decrease the cutting performance of molten jet 504 (see FIG. 5) depending, for example, on the design (e.g., material and wall-thickness) of rocket motor case 112. Further, the cross-section area of main charge cavity 168 may be varied to increase and/or decrease the scoring performance of molten jet 302 (see FIG. 3) depending, for example, on the design (e.g., material and wall-thickness) of rocket motor case 112.

Turning now to FIG. 7 and FIG. 8, a perspective section view of a thermally initiated variable venting system (system) 700 is illustrated, in accordance with various embodiments. System 700 may be similar to system 100 (see FIG. 1A through FIG. 6). System 100 may include a rocket motor 710 comprising a rocket motor case 712, and a cover 720 housing a first LSC 750 extending from an SCO sensor 730 and a second LSC 760 extending from an FCO sensor 740.

In various embodiments, at least a portion of FCO sensor 740 may be exposed to the atmosphere. The FCO sensor 740 may be configured to ignite second LSC 760 in response to a preselected temperature and temperature duration having been reached. For example, one or more thermal cords 802 may self-ignite in a maximum time of 30 seconds when exposed to temperatures above 550° F. (288° C.). In various embodiments, one or more thermal cords 802 may self-ignite in a maximum time of 30 seconds when exposed to temperatures above 600° F. (316° C.). Thermal cord 802 may be a pyrotechnic device which is specifically sensitive to temperature and is formulated to ignite (and provide a signal indicative thereof) in response to a preselected temperature and temperature duration having been reached. The signal may be provided by ignition of the thermal cord 802 in a time less than the fast cook off time of the rocket motor grain or other device being protected. The fast cook-off time is the time that the motor is exposed to a given temperature with a requirement for survival (i.e. no explosion or ignition of the motor fuel grain). FCO sensor 740 may ignite LSC 760 using additional energetics and/or components disposed within FCO sensor 740.

When the second LSC 760 is ignited, it preferably cuts one or more stress raising notches in the outer portion of the rocket motor case 712, or may cut directly through the rocket motor case 712 to the grain (see FIG. 4 and FIG. 6). The stress raising notches may be cut in selected locations along the length of the rocket motor case 712. These notches or cuts are sufficient so that when the grain ignites, the rocket motor case 712 splits and pressure is vented out of the split side rather than developing pressure which causes significant thrust by exhausting from the nozzle. In this way, the rocket motor 710 is prevented from uncontrolled flight due to fire while the rocket motor is in storage, transport, or on an airplane prior to flight.

In various embodiments, SCO sensor 730 may comprise an intermetallic thermal sensor. SCO sensor 730 may ignite LSC 750 using additional energetics and/or components disposed within SCO sensor 730. In various embodiments, the trigger temperature (SCO temperature) may range from approximately 290° F. to approximately 400° F. (143° C.-204° C.).

Figure 9:
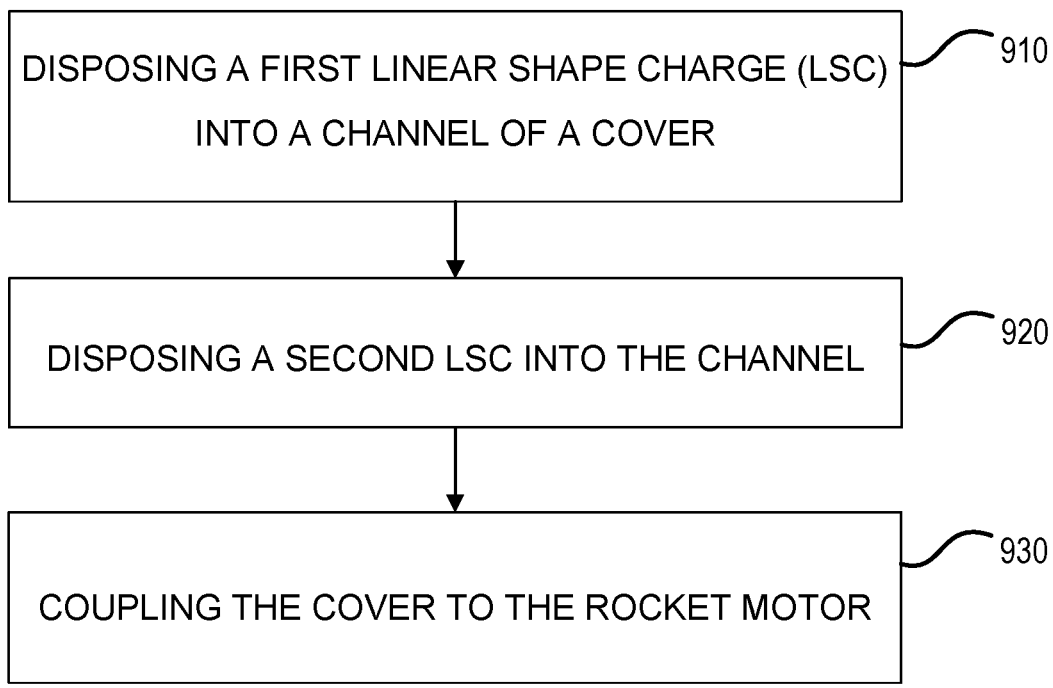
FIG. 9 illustrates a method for manufacturing a thermally initiated variable venting system, in accordance with various embodiments.

With reference to FIG. 9, a flow chart showing a method 900 for method for manufacturing a thermally initiated variable venting system is illustrated, in accordance with various embodiments. Method 900 includes disposing a first linear shape charge (LSC) into a channel of a cover (step 910). Method 900 includes disposing a second LSC into the channel (step 920). Method 900 includes coupling the cover to the rocket motor (step 930).

With combined reference to FIG. 1B and FIG. 9, step 910 may include disposing first LSC 150 into channel 122 of cover 120. Step 920 may include disposing second LSC 160 into channel 122. In various embodiments, step 920 may include disposing an upper apex (e.g., upper apex 181 of FIG. 2) of second LSC 160 within a lower apex (e.g., lower apex 182 of FIG. 2)(see FIG. 2) of first LSC 150. Step 930 may include coupling cover 120 to rocket motor case 112. Cover 120 may be coupled to rocket motor case 112 such that opening 123 of channel 122 faces rocket motor case 112. In various embodiments, cover 120 is coupled to rocket motor case 112 via fasteners. In various embodiments, cover 120 is coupled to rocket motor case 112 via an adhesive. In various embodiments, cover 120 is coupled to rocket motor case 112 via a metal joining process such as welding, soldering, brazing, or the like. It is appreciated, however, that cover 120 may be coupled to rocket motor case 112 via any suitable method.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A thermally initiated variable venting system for a rocket motor case, comprising:
a first linear shape charge (LSC) coupled to a first sensor; and
a second LSC coupled to a second sensor;
wherein the first LSC radially overlaps the second LSC;

the first sensor is configured to activate to ignite the first LSC in response to at least a portion of the first sensor reaching a first temperature;

the second sensor is configured to activate to ignite the second LSC in response to at least a portion of the second sensor reaching a second temperature;

the thermally initiated variable venting system configured to project a molten jet towards the rocket motor case in response to at least one of the first LSC being ignited by the first sensor and the second LSC being ignited by the second sensor.

2. The thermally initiated variable venting system of claim 1, wherein the molten jet is greater in response to the first LSC being ignited by the first sensor.

3. The thermally initiated variable venting system of claim 2, wherein the molten jet is configured to cut a slot through a motor case in response to the first LSC being ignited by the first sensor.

4. The thermally initiated variable venting system of claim 2, wherein the molten jet is configured to cut a trench into a motor case in response to the second LSC being ignited by the second sensor.

5. The thermally initiated variable venting system of claim 2, wherein at least one of a velocity, a pressure, and a temperature of the molten jet is greater in response to the first LSC being ignited by the first sensor than in response to the second LSC being ignited by the second sensor.

6. The thermally initiated variable venting system of claim 1, wherein the molten jet is generated by a detonation wave that travels in a direction perpendicular to the molten jet.

7. The thermally initiated variable venting system of claim 1, wherein the first temperature is less than the second temperature.

8. The thermally initiated variable venting system of claim 1, wherein the first sensor comprises a slow cook off (SCO) sensor and the second sensor comprises a fast cook off (FCO) sensor.

9. The thermally initiated variable venting system of claim 1, wherein the first LSC comprises:
 a sheath defining a main charge cavity; and
 an explosive charge material contained in the main charge cavity.

10. The thermally initiated variable venting system of claim 9, wherein the sheath comprises a hollowed chevron-shaped cross-section that defines the main charge cavity, the chevron-shaped cross-section defining an upper apex and a lower apex, and an upper apex of the second LSC is disposed in the lower apex of the first LSC.

11. A rocket motor, comprising:
 a rocket motor case;
 a cover coupled to the rocket motor case and extending longitudinally along an outer surface of the rocket motor case;
 a channel disposed in the cover, an opening of the channel facing the rocket motor case;
 a first linear shape charge (LSC) coupled to a first sensor, at least a portion of the first LSC disposed in the channel; and
 a second LSC coupled to a second sensor, at least a portion of the second LSC disposed in the channel;
 wherein the second LSC is disposed between the first LSC and the rocket motor case;
 the first sensor is configured to activate to ignite the first LSC in response to at least a portion of the first sensor reaching a first temperature;
 the second sensor is configured to activate to ignite the second LSC in response to at least a portion of the second sensor reaching a second temperature;
 wherein a molten jet is projected from the opening in the channel in response to at least one of the first LSC being ignited by the first sensor and the second LSC being ignited by the second sensor.

12. The rocket motor of claim 11, wherein the molten jet is configured to cut a slot through a motor case in response to the first LSC being ignited by the first sensor.

13. The rocket motor of claim 11, wherein the molten jet is configured to cut a trench into a motor case in response to the second LSC being ignited by the second sensor.

14. The rocket motor of claim 11, wherein at least one of a velocity, a pressure, and a temperature of the molten jet is greater in response to the first LSC being ignited by the first sensor than in response to the second LSC being ignited by the second sensor.

15. The rocket motor of claim 11, wherein the first temperature is less than the second temperature.

16. The rocket motor of claim 11, wherein the first sensor comprises a slow cook off (SCO) sensor and the second sensor comprises a fast cook off (FCO) sensor.

17. The rocket motor of claim 11, wherein the first LSC comprises:
 a sheath defining a main charge cavity; and
 an explosive charge material contained in the main charge cavity.

18. The rocket motor of claim 17, wherein the sheath comprises a hollowed chevron-shaped cross-section that defines the main charge cavity, the chevron-shaped cross-section defining an upper apex and a lower apex, and an upper apex of the second LSC is disposed in the lower apex of the first LSC.

19. A method for manufacturing a thermally initiated variable venting system, comprising:
 disposing a first linear shape charge (LSC) into a channel of a cover;
 disposing a second LSC into the channel;
 coupling a second sensor to the second LSC configured to activate to ignite the second LSC in response to at least a portion of the second sensor reaching a second temperature; and
 coupling the cover to a rocket motor case, wherein an opening in the channel faces the rocket motor case, the second LSC disposed between the first LSC and the rocket motor case, such that a molten jet is projected from the opening towards the rocket motor case in response to at least one of the first LSC being ignited by the first sensor and the second LSC being ignited by the second sensor.

20. The method of claim 19, further comprising disposing an upper apex of the second LSC within a lower apex of the first LSC.

* * * * *

UNITED STATES PATENT AND TRADEMARK OFFICE
CERTIFICATE OF CORRECTION

PATENT NO. : 10,830,181 B2
APPLICATION NO. : 16/136125
DATED : November 10, 2020
INVENTOR(S) : Luis G. Interiano Page 1 of 1

It is certified that error appears in the above-identified patent and that said Letters Patent is hereby corrected as shown below:

In the Claims

Column 10, Line 45, after "disposing a second LSC into the channel", please insert -- coupling a first sensor to the first LSC configured to activate to ignite the first LSC in response to at least a portion of the first sensor reaching a first temperature; --

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*